Nov. 6, 1934.  D. R. McMULLEN  1,979,982
GAUGE GLASS ILLUMINATOR
Filed May 20, 1933   2 Sheets-Sheet 2

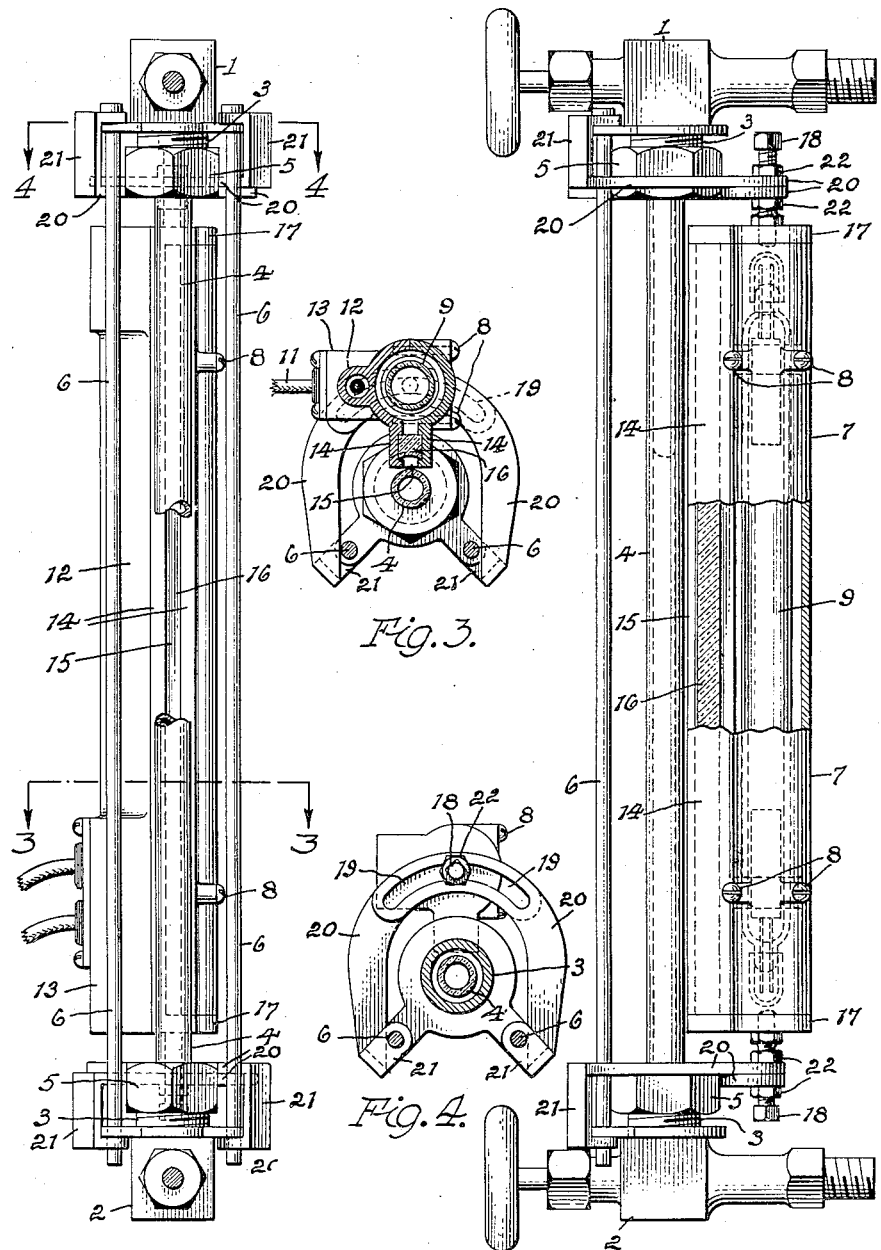

INVENTOR
Donald R. McMullen,
BY
ATTORNEYS

Patented Nov. 6, 1934

1,979,982

UNITED STATES PATENT OFFICE 1,979,982

GAUGE GLASS ILLUMINATOR

Donald R. McMullen, Detroit, Mich., assignor to Wright Austin Company, Detroit, Mich., a corporation of Michigan Application May 20, 1933, Serial No. 672,007

2 Claims. (Cl. 240—2.15)

This invention relates to a device especially applicable to indicators, such as water gauges for indicating the level of water in a boiler, said device including a light for illuminating the gauge glass so that the height of water therein may be seen at a distance.

An object of the present invention is to provide an illuminating device for the purpose including a neon tube as the light source or lamp, and to provide suitable means for supporting such a tube or similar elongated lamp adjacent a gauge glass, to extend substantially the full length of the glass, such supporting means including an inclosing casing for the lamp and having an elongated opening to direct the light rays directly upon the gauge glass throughout substantially its full length.

A further object is to provide suitable means for adjustably supporting such a casing for such lamp, upon the support for the gauge glass, whereby said casing is held with its elongated opening adjacent said glass and whereby it may be adjusted about said glass to direct the light rays in the desired direction thereon.

Other objects and advantages of the construction, arrangement and combination of parts will more fully appear from the following description of the operation and from the construction as shown in the accompanying drawings wherein;

Figure 1 is a side elevation of a water gauge and an attachment illustrative of an embodiment of the present invention, applied thereto and shown, partly in side elevation and partly in section;

Fig. 2 is a front elevation of Fig. 1 with a portion of the gauge glass broken away;

Fig. 3 is a transverse section upon the line 3—3 of Fig. 2;

Fig. 4 is a similar section upon the line 4—4 of Fig. 2;

Figures 5, 6:
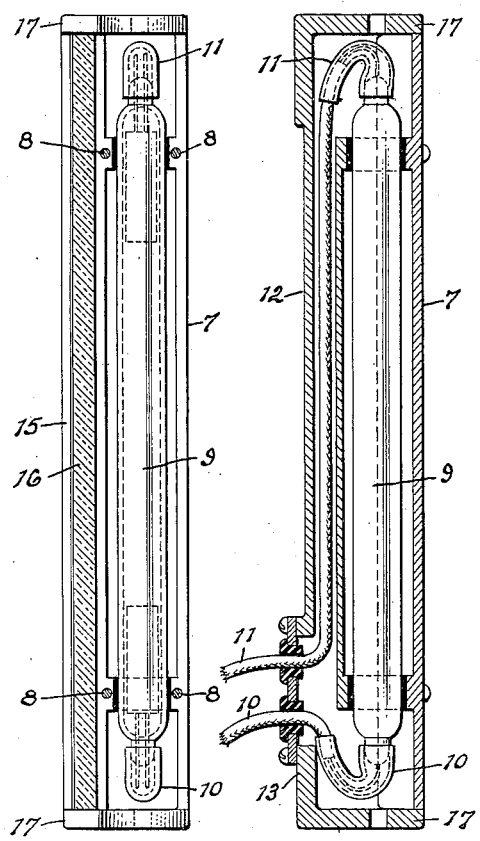
Fig. 5 is a longitudinal section through a casing for a lamp.
Fig. 6 is a longitudinal section of the casing taken at right angles to that of Fig. 5.

The device illustrative of an embodiment of the present invention, is shown in Figs. 1 and 2 of the accompanying drawings, as applied to a water gauge for boilers, of an old and well known construction including top and bottom shut-off valves 1 and 2 having stems for connection to the boiler and each provided with a laterally extending externally screwthreaded nipple 3 to receive the upper and lower ends of a glass gauge tube 4, said nipples being each provided with a packing gland in the form of an external nut 5 screwed upon each nipple in the usual manner to make a water and steam tight joint between nipples and tube ends. The two valve casings 1 and 2 are tied together in the usual manner by the usual tie rods 6 extending parallel with and spaced from the tube 4.

The attachment embodying the present invention includes a casing indicated as a whole by the numeral 7 and including two similar parts or halves detachably secured together by screws 8 the two parts when so secured together, forming a cylindrical casing, axially in which is mounted a glass tube containing an inert gaseous element taken from the atmosphere and known as neon gas, the tube being commercially known as a neon tube 9 to the ends of which are connected leads 10 and 11 to form an electric circuit through the neon tube, the lead 11, for convenience, being led downward through a lateral enlargement 12 upon one side of one half of the casing, to what may be termed an outlet box 13 at the lower end of the casing and through which box the lead 10 is also led. Projecting from the front side of each half of the casing 7 is a flange 14, these flanges being spaced apart to form between them, an open slot 15 extending approximately the full length of the casing to direct the light rays from the lamp or neon tube 9, onto the gauge glass 4, the casing being supported with the open side of this slot close to said gauge glass and extending substantially the full length of said glass, and secured between these flanges 14 across the slot, is a lens 16 in the form of a long glass bar having a concaved outer side and thus forming a lens extending the full length of the slot 15 to direct, upon the gauge glass, the light rays passing therethrough, so that the water level in the gauge glass may be readily seen.

The side or half of the casing 7 which is formed with the tubular lateral projection or rib 12 for the lead wire 11, is also formed with end plates 17 to close the ends of the casing, and screwed into these plates axially of the casing, are pivot screws 18, each of which passes loosely through arcuate slots 19 in the overlapping ends of a pair of bracket members 20 which together form a horseshoe shaped bracket for supporting an end of the said casing, the legs of each of which brackets extend forwardly at the sides of and spaced from the adjacent gland nut 5 which holds an end of the gauge glass 4. The forward end of each leg of each member 20 of each bracket is pivotally attached to one of the stay rods 6 by means of an extension 21 having an opening through which the end of the rod extends, so that by loosening lock nuts 22 on the pivot screws 18 supporting the ends of the casing 7, said screws may be moved along the arcuate slots 19 in said brackets and the casing thus adjusted about the gauge tube to bring the slot 15 into a different angular relation to the gauge glass and direct the light rays at the desired lateral angle so that the water level may be readily seen from a position other than directly in front of the gauge. Further, by adjusting the members 20 of each bracket relative to each other by swinging these members upon their pivotal supports on the rods 6, the casing 7 may be adjusted bodily toward or from the gauge glass to bring the outer open end of its slot 15 nearer to or farther from said glass.

With this arrangement of illumination, the light rays are confined and directed upon the gauge glass only, the light slot 15 being narrower than the diameter of the gauge glass and the open side of this slot being close to said glass. Further these rays are directed upon the glass by the lens 16 throughout substantially the full length of the glass as this slot in the casing is nearly as long as the gauge glass, and therefore the water level in the glass is made distinctly visible and from any desired angle by adjusting the casing about the gauge glass.

Figure 7:
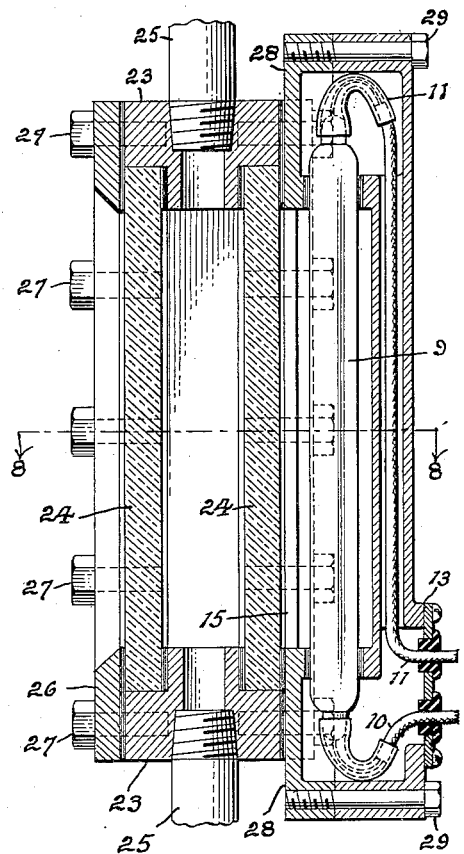
Fig. 7 is a longitudinal section through a modified form of water gauge and lamp casing applied thereto.
Figure 8:
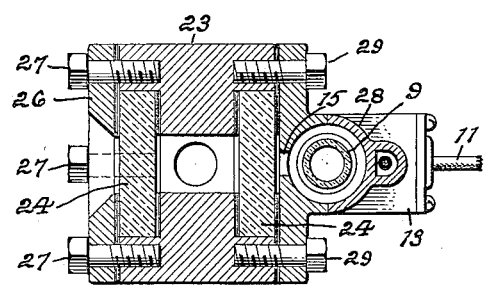
Fig. 8 is a transverse section substantially upon the line 8—8 of Figure 7.

In Figs. 7 and 8 of the drawings, a different construction of water gauge is shown, this gauge being designed to withstand high steam pressures and consists of a heavy body indicated as a whole by the numeral 23 having long recesses in opposite sides thereof in which heavy glass plates 24 are set, the space between these plates and the opposed and spaced apart sides of the body forming the water space of the gauge, which space is in communication with the water space of the boiler, through pipes 25 screwed into openings in the ends of the body. This is an old and well known construction of gauge, the front glass 24 being secured in place by a clamping frame 26 secured in place by a series of bolts 27, but instead of a similar clamping frame being employed to hold the glass at the rear side in place, a casing 28 for a neon tube and of a construction quite similar to that of the casing 7, is secured directly against the rear side of the gauge body 23 by bolts 29, the light slot similar to the slot 15 being directly opposite the rear glass 24 to direct the light rays from the neon tube in said casing 23, directly through the windows or glasses 24 to clearly show the height of water in the gauge.

With this arrangement of casing for holding a light and having a slot to direct the light rays, which slot is substantially equal in length to the length of the gauge glass or its equivalent, these rays are confined and directed in a long narrow beam, directly upon and through the gauge where it will be most effective, and no light escapes laterally from the casing which would tend to confuse or partially blind the party looking at the gauge so that he could not determine with certainty, the water level. The lens positioned within this slot, also directs and concentrates the light rays upon the gauge glass, and it will be apparent that, while such a lens is not shown in connection with the gauge shown in Figs. 7 and 8, such a lens may, if desired, be embodied in such construction.

A neon tube light is preferable as it furnishes a light of extended length to be positioned opposite the light slot and illumines the gauge through its length, and may be conveniently positioned and held within the casing and is of small diameter, thus permitting the use of a casing of minimum diameter. Other forms of lamps are however contemplated as are also other forms and constructions of casing therefor and the manner and means for attaching the same to water gauges or other devices which it is desired to illuminate, and it is obvious that such changes may be made without departing from the spirit of the present invention and within the scope of the appended claims.

What I claim is:—

1. In a device of the character described, a casing formed of two similar elongated substantially semi-cylindrical parts, detachable means for securing said parts together, means in one of said parts for supporting a neon tube, means adjacent to one end of one of said parts for receiving leads, means in one of said parts for accommodating the extension of a lead from the end where it enters the casing to the remote end of said neon tube, means on one of said parts for closing the ends of said casing, and flanges formed on said parts, said flanges being formed to extend lengthwise throughout approximately the entire length of said casing and being arranged on said parts so that when the later are secured together they form an open slot for the reception of a lens member.

2. In combination with a gauge, a substantially semi-cylindrical body, end plates formed on said body, adjustable supporting members associated with said gauge and connected to said end plates, a second semi-cylindrical part, means in said part for supporting a neon tube, detachable means for securing both of said semi-cylindrical parts together, flanges formed on said semi-cylindrical parts, said flanges being arranged so that when said parts are secured together they form an open slot extending lengthwise, and a lens member supported in said open slot by said flanges.

DONALD R. McMULLEN.